Patented Feb. 28, 1933

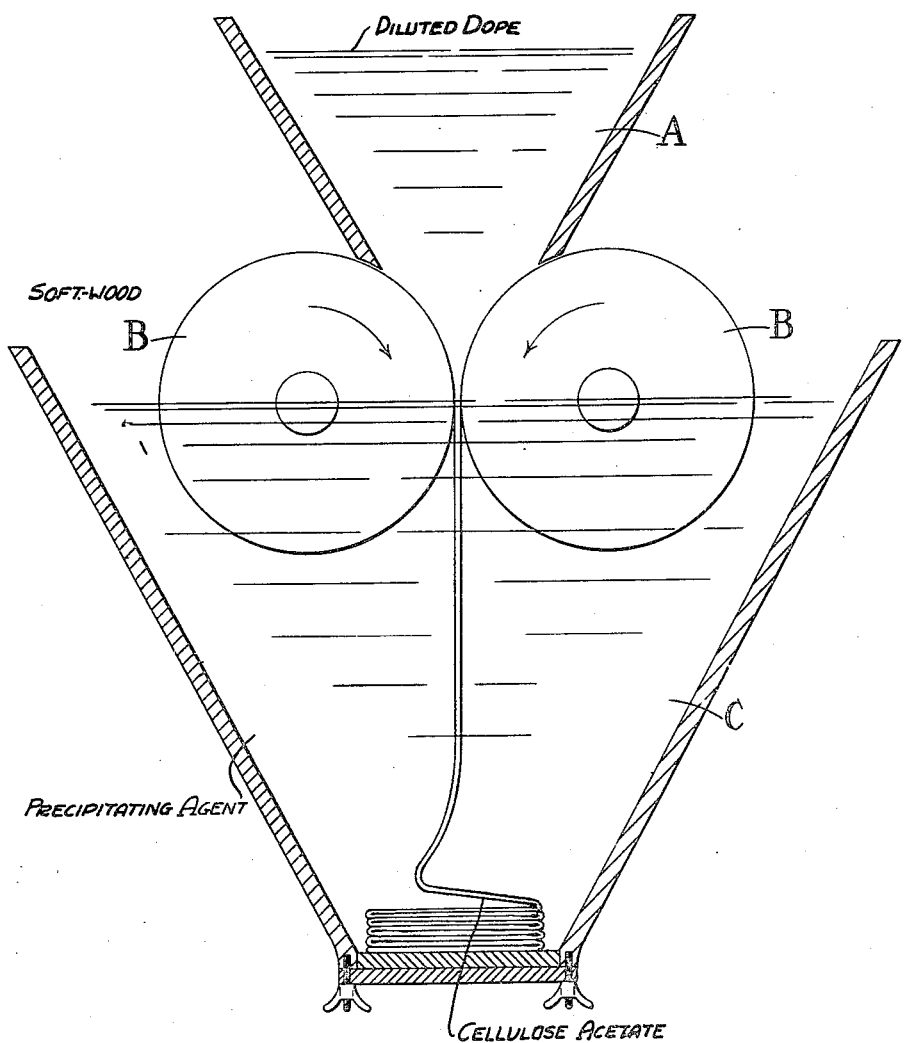

1,899,061

UNITED STATES PATENT OFFICE

OSWALD SILBERRAD, OF LOUGHTON, AND HARRY BLEASDALE, OF EDMONTON, ENGLAND

MANUFACTURE OF CELLULOSE ACETATE

Application filed April 15, 1930, Serial No. 444,599, and in Great Britain March 19, 1930.

This invention is for improvements in and relating to the manufacture of cellulose acetate and concerns the precipitation of cellulose acetate from acid dope. By the term acid dope we mean the product of acetylating cellulose at the stage at which it is ready for precipitation irrespective as to whether it is desired to precipitate the primary product of acetylation or the material which results from submitting this primary product to any after treatment, as for example, ripening it until any desired modification in its properties, for example, solubility in acetone, has been brought about; for example, by allowing it to stand after adding a quantity of water slightly in excess of that necessary to convert the excess of acetic anhydride originally present in the product of acetylation into acetic acid, for example 6–10 per cent of water. "Acid dope" therefore consists essentially of a viscous solution of cellulose acetate and/or hydrated acetate in acetic acid, whether or not the said solution has been concentrated by distillation or otherwise.

In the manufacture of cellulose acetate it is customary to stir water into the acid dope until the acetate is precipitated, after which the precipitated material is separated, washed and dried. In practice this method of precipitation produces a material in a form which can only be freed from acid, sulphuric esters and like impurities by prolonged soaking and washing. Moreover, precipitated in this manner, the cellulose acetate varies very much in size, and the fines suffer serious deterioration in the subsequent processes of washing and soaking before the coarser parts of the jelly-like product can be freed from acid and rendered sufficiently stable to pass the carbonization test. As a result much of the fines undergo degradation and are lost in the wash liquors, the yield is adversely affected and a final product is obtained which is not uniform in character.

The present invention relates to a process whereby these difficulties may be overcome and an increased yield of a superior product obtained, the time occupied in washing, soaking and drying very materially shortened and the cost of manufacturing considerably reduced.

The invention has particular reference to the precipitation of cellulose acetate in a porous form and preferably of even thickness or in a uniform state of subdivision.

It has been proposed to convert cellulose acetate into film, silk or other formed goods by causing a solution of said cellulose acetate in acetic acid to pass into a suitable precipitant. In this manner it is claimed that cellulose acetate can be obtained of the desired lustrous impervious horn-like consistency essential to such goods. We have discovered, however, that under certain conditions cellulose acetate can be precipitated from its solution in acetic acid in an opaque, highly porous condition which is remarkably easy to wash free from acid, and subsequently to dry.

It should be clearly understood that our invention does not relate to the production of formed goods from cellulose acetate, but to the manufacture of cellulose acetate itself. Indeed our process yields the cellulose acetate in a porous opaque condition quite useless where form or shape is essential, but highly satisfactory as an intermediate state in the manufacture of the raw material for making up the solutions required for the subsequent manufacture of silk, films or other formed goods.

More specifically, this invention consists in a process for the precipitation of cellulose acetate from ripened acid dope, ripened to at least acetone-solubility, by adding water to the dope in quantity nearly sufficient to initiate precipitation, and then bringing the so-treated dope into contact with water, in such manner that from the moment of contact the thus diluted dope is submerged in a body of water in excess.

The ripened acid dope diluted substantially to the point of precipitation is preferably brought into contact with the water in the manner aforesaid in a form to present an extended surface. Thus the diluted acid dope may be introduced into the water by passage thereinto between rollers or bands or other suitable form of movable elements.

Such elements may advantageously be of such material or design as to carry moisture. Alternatively, the diluted acid dope may be introduced in a stream, the water being agitated or not according to the mechanical state of division in which it is desired to obtain the final porous product.

The quantity of water, which is added to the acid dope prior to introducing the latter into excess according to the invention may be varied over a fairly wide range. If, however, insufficient water be added at this stage then the final precipitated product will not be sufficiently porous but will possess a more or less gelatinous nature and cannot be washed free from acid much more readily than acetate precipitated in the usual manner. On the other hand, if the addition of water to the acid dope be such that partial precipitation occurs prior to the introduction into excess of water, the precipitated product will be mechanically weak and liable to break up into a fine powder, which also is undesirable. It is, therefore, preferred, prior to bringing the thus diluted acid dope into contact with excess of water, to add to the acid dope a quantity of water equal to about 60–75 per cent of that required to cause the precipitation of the cellulose acetate to commence. The invention is, of course, not confined to these proportions, but any desired quantity of water may be added prior to effecting contact of the diluted acid dope with excess of water, provided due regard be paid to the above considerations.

In any case a simple preliminary experiment will suffice to determine the best conditions for a particular acid dope.

It is preferable to neutralize any strong acid such as sulphuric acid or the like present in the acid dope by adding excess of sodium acetate, soda ash or other suitable neutralizing agent, and this addition may be made together with the water wherewith the dilution is effected. The invention is not restricted to dope in which the sulphuric acid or the like has been neutralized at this or any other particular stage; indeed the precipitated cellulose acetate may be obtained by the process of this invention in a form which is so porous and easy to wash that it is possible, though not always advisable, to dispense with neutralization altogether. The acid dope may be diluted before ripening, but by so doing the yield and quality of the product are adversely influenced, and it is preferred therefore not to increase the quantity of water added to induce ripening beyond the normal quantity, say 6–8 per cent on the product of primary acetylation but to add the whole of the water required to effect the above mentioned dilution immediately before precipitation.

In carrying the invention into effect in one way, 40 gallons of water are mixed into 1000 lbs. of acid dope, ripened to the degree of solubility in acetone, in a vessel fitted with mixing gear, and the diluted acid dope then fed in between rollers, preferably constructed of soft wood or other readily water absorbent material, said rollers being partially submerged in water and so arranged as to run inwardly. A doctor or other appliance for assisting the freshly precipitated cellulose acetate to leave the surface of the rollers may be fitted if desired. In this manner the cellulose acetate is precipitated in a continuous band, sufficiently porous to render the subsequent washing, soaking and drying operations easy, and sufficiently strong to be handled without the production of fines; whilst being of an extremely even thickness. Modification, if any, which may be induced in the product by the subsequent operations of washing, soaking and drying are constant.

An arrangement of apparatus suitable for effectuating this mode of operation is shown diagrammatically in the accompanying drawing.

In this drawing, A is the feed-supply vessel for the diluted dope, B, B are rollers of soft wood, the direction of motion of which is shown by the arrows, and C is a bath containing the precipitating agent, wherein said rollers are partially submerged.

Instead of passing the suitably diluted acid dope between rollers as described it may be run between endless bolts passing over rollers, said bolts being partially submerged in water and constructed of any suitable material, for example, chrome-tanned leather, cotton filter cloth or the like, which method of procedure gives rise to a band or ribbon very similar to that produced in accordance with the above example. Alternatively, the cellulose acetate may be precipitated in sheets of approximately even thickness by running the diluted acid dope into flat bottomed vessels, and allowing water to diffuse into the diluted acid dope in any convenient manner, as for example, by running the acid dope so rapidly into a flat bottomed vessel containing water that it flows to the bottom of the said vessel and settles in a thin layer into which the water will diffuse on standing, thereby causing the cellulose acetate to separate out in porous sheets. A similar result may be obtained by running the diluted acid dope into trays or flat bottomed vessels and submerging or flooding said trays, or otherwise bringing the surface of the diluted acid dope into contact with water under conditions to permit the latter to diffuse into the dope.

It is to be understood that the acid dope and/or cellulose acetate precipitated therefrom may be caused to flow in a direction counter to the excess of precipitating reagent with which it is brought into contact.

It will be appreciated that while the invention is described and claimed herein as effectuated by means of water as the precipitant, and equivalent precipitant, for example, dilute acetic acid, may be employed instead of water; and the word "water" used hereinbefore and in the claims is to be understood to include the equivalents. If dilute acetic acid be employed to dilute the acid dope in the first instance a proportionately larger quantity will generally be found necessary to produce the desired effect.

We claim:

1. The process of manufacture of cellulose acetate in porous, opaque form which comprises adding to ripened acid dope substantially 60 to 75 per cent of the quantity of water required to initiate precipitation, and then bringing the so-diluted dope into contact with water in such manner that from the moment of contact the dope is submerged in a body of water in excess.

2. The process of manufacture of cellulose acetate in porous, opaque form which comprises adding to ripened acid dope substantially 60 to 75 per cent of the quantity of water required to initiate precipitation, and then bringing the so-diluted dope in a form presenting an extended contact surface into contact with water in such manner that from the moment of contact the dope is submerged in a body of water in excess.

3. The process of manufacture of cellulose acetate in porous, opaque form which comprises adding to ripened acid dope substantially 60 to 75 per cent of the quantity of water required to initiate precipitation, and then bringing the so-diluted acid dope in sheet form into contact with water in such manner that from the moment of contact the dope is submerged in a body of water in excess.

4. The process of manufacture of cellulose acetate in porous, opaque form which comprises adding to ripened acid dope substantially 60 to 75 per cent of the quantity of water required to initiate precipitation, and then causing the so-diluted dope to be carried between movable extruding elements into a body of water in excess.

5. The process of manufacture of cellulose acetate in porous, opaque form which comprises adding to ripened acid dope substantially 60 to 75 per cent of the quantity of water required to initiate precipitation, and then causing the so-diluted dope to be carried between moistened water absorbing movable extruding elements into a body of water in excess.

6. The process of manufacture of cellulose acetate in porous, opaque form which comprises adding to ripened acid dope substantially 60 to 75 per cent of the quantity of water required to initiate precipitation, and then causing the so-diluted dope to be carried between sheet-forming, movable, moistened, water-absorbing, extruding elements into a body of water in excess.

7. The process of manufacture of cellulose acetate in porous, opaque form which comprises adding to ripened acid dope substantially 60 to 75 per cent of the quantity of water required to initiate precipitation, and then causing the so-diluted dope to be carried in between moistened water absorbing rollers into a body of water in excess.

OSWALD SILBERRAD.
HARRY BLEASDALE.